United States Patent
Sokolov et al.

(10) Patent No.: US 10,938,295 B2
(45) Date of Patent: Mar. 2, 2021

(54) MULTIPHASE AC POWER SUPPLY WITH CORRECTION OF DISTORTIONS OF CONSUMED CURRENT

(71) Applicants: Yuriy Borisovich Sokolov, Fryazino (RU); Mikhail Viktorovich Strelnikov, Khimki (RU)

(72) Inventors: Yuriy Borisovich Sokolov, Fryazino (RU); Mikhail Viktorovich Strelnikov, Khimki (RU)

(73) Assignee: Yuriy Borisovich Sokolov, Fryazino (RU)

( * ) Notice: Subject to any disclaimer, the term of this patent is extended or adjusted under 35 U.S.C. 154(b) by 0 days.

(21) Appl. No.: 16/343,978

(22) PCT Filed: Nov. 3, 2017

(86) PCT No.: PCT/RU2017/000823
§ 371 (c)(1),
(2) Date: Apr. 22, 2019

(87) PCT Pub. No.: WO2018/101856
PCT Pub. Date: Jun. 7, 2018

(65) Prior Publication Data
US 2019/0252967 A1    Aug. 15, 2019

(30) Foreign Application Priority Data
Nov. 30, 2016   (RU) .................................. 2016146977

(51) Int. Cl.
*H02M 7/12* (2006.01)
*H02M 7/17* (2006.01)
(Continued)

(52) U.S. Cl.
CPC ............... *H02M 1/12* (2013.01); *H02M 7/17* (2013.01); *H02M 7/2173* (2013.01); *H05B 45/37* (2020.01)

(58) Field of Classification Search
CPC ........ H02M 7/17; H02M 7/23; H02M 7/2173; H02M 7/2176; H02M 7/219
See application file for complete search history.

(56) References Cited

U.S. PATENT DOCUMENTS 5,031,087 A * 7/1991 Tuusa ................... H02M 7/219
                                                                363/63
5,406,470 A * 4/1995 Ridley .................. H02M 3/285
                                                                323/207
(Continued)

FOREIGN PATENT DOCUMENTS

CN        201014370 Y     1/2008
CN        203068326 U     7/2013
(Continued)

OTHER PUBLICATIONS

Zumtobel company catalog, p. 36, http://zumtobel.com/com-en/products/lights_fields [online].
(Continued)

*Primary Examiner* — Thienvu V Tran
*Assistant Examiner* — Sisay G Tiku
(74) *Attorney, Agent, or Firm* — Bryant J. Keller; Kirton McConkie

(57) ABSTRACT

A multi-phase network power supply with compensation for harmonic oscillations relates to electrical engineering and is intended for supplying various electrical devices connected to a multi-phase alternating-current electrical network. The technical result of the claimed solution consists in lessening harmonic components, reducing pulsations in the voltage and current output by the power supply, and significantly reducing the required power. The multi-phase alternating-
(Continued)

current network power supply with compensation for harmonic oscillations comprises a main multi-phase rectifier of the alternating-current network, an additional multi-phase rectifier, a controller and an additional voltage or current supply, wherein the positive terminal of the main multi-phase rectifier is capable of being connected to a load, and the negative terminal of the main multi-phase rectifier is connected to the positive terminal of the additional voltage or current supply, the negative terminal of which is capable of being connected to a load, the output terminals of the additional multi-phase rectifier are connected to the input terminals of the additional voltage or current supply, wherein the additional multi-phase rectifier is equipped with electronic switches, one in the circuit of each rectifying element, and each electronic switch is connected to the controller.

19 Claims, 17 Drawing Sheets

(51) Int. Cl.
  *H02M 7/217* (2006.01)
  *H02M 7/145* (2006.01)
  *H02M 1/12* (2006.01)
  *H05B 45/37* (2020.01)

(56) References Cited

U.S. PATENT DOCUMENTS

| | | | |
|---|---|---|---|
| 6,219,263 B1 | 4/2001 | Wuidart | |
| 6,256,213 B1* | 7/2001 | Illingworth | H02M 3/33576 363/126 |
| 6,799,449 B2* | 10/2004 | Park | B21D 26/055 29/421.1 |
| 6,861,936 B2* | 3/2005 | Kamath | H01F 30/12 336/148 |
| 7,276,861 B1 | 10/2007 | Shteynberg et al. | |
| 7,534,002 B2 | 5/2009 | Yamaguchi et al. | |
| 7,609,536 B2* | 10/2009 | Brochu | H02M 7/08 323/255 |
| 8,487,546 B2 | 7/2013 | Melanson | |
| 8,553,440 B1* | 10/2013 | Nanut | H02M 7/10 363/129 |
| 8,885,372 B1* | 11/2014 | Nanut | H02M 1/12 307/11 |
| 9,136,774 B2* | 9/2015 | Yamanaka | H02M 5/4585 |
| 9,154,048 B2* | 10/2015 | Swamy | H02M 7/08 |
| 9,935,561 B2* | 4/2018 | Ide | H02M 1/10 |
| 2001/0022736 A1* | 9/2001 | Suzuki | H02M 1/4233 363/69 |
| 2005/0135126 A1* | 6/2005 | Gazel | H02M 7/08 363/67 |
| 2005/0146226 A1* | 7/2005 | Trainer | H02M 1/12 307/73 |
| 2008/0202312 A1 | 8/2008 | Zane et al. | |
| 2008/0219036 A1* | 9/2008 | Colombi | H02J 9/062 363/126 |
| 2008/0303972 A1 | 12/2008 | Han et al. | |
| 2009/0086515 A1* | 4/2009 | Sakakibara | H02M 5/4585 363/37 |
| 2011/0068700 A1 | 3/2011 | Fan | |
| 2011/0134639 A1 | 6/2011 | Chung et al. | |
| 2011/0242864 A1* | 10/2011 | Satou | H02M 1/08 363/127 |
| 2012/0099317 A1 | 4/2012 | Liu | |
| 2012/0212984 A1* | 8/2012 | Yamada | H02M 7/219 363/89 |
| 2013/0051097 A1* | 2/2013 | Katsumata | H02M 7/1626 363/85 |
| 2013/0082611 A1 | 4/2013 | Cohen | |
| 2013/0181626 A1 | 7/2013 | Chen | |
| 2013/0215606 A1 | 8/2013 | Wang et al. | |
| 2014/0062333 A1 | 3/2014 | Sonobe | |
| 2014/0091723 A1 | 4/2014 | Kuo | |
| 2014/0361623 A1 | 12/2014 | Siessegger et al. | |
| 2015/0256100 A1 | 9/2015 | De Vaal | |
| 2016/0174318 A1 | 6/2016 | Mignano et al. | |
| 2016/0242248 A1 | 8/2016 | Leskinen | |
| 2016/0262228 A1 | 9/2016 | Huang et al. | |
| 2017/0063215 A1* | 3/2017 | Nikitin | H02M 1/12 |
| 2019/0252967 A1 | 8/2019 | Sokolov et al. | |

FOREIGN PATENT DOCUMENTS

| | | |
|---|---|---|
| CN | 203477931 U | 3/2014 |
| CN | 203500894 U | 3/2014 |
| CN | 203731137 U | 7/2014 |
| DE | 20 2010 004 780 U1 | 10/2011 |
| GB | 2 348 272 A | 9/2000 |
| JP | 2008-091185 A | 4/2008 |
| JP | 2012-169293 A | 9/2012 |
| KR | 100457878 A | 11/2004 |
| KR | 20090019625 A | 2/2009 |
| KR | 101415690 B1 | 7/2014 |
| KR | 101430021 B1 | 8/2014 |
| KR | 101434508 | 8/2014 |
| RU | 2301475 C1 | 6/2007 |
| RU | 112 340 | 1/2012 |
| RU | 2452893 C1 | 6/2012 |
| RU | 118 398 U1 | 7/2012 |
| RU | 128 696 U1 | 5/2013 |
| RU | 147907 | 11/2014 |
| RU | 2552100 | 6/2015 |
| RU | 2592890 C1 | 7/2016 |
| RU | 168569 U1 | 2/2017 |
| SU | 629403 A1 | 10/1978 |
| SU | 1227910 A1 | 4/1986 |
| SU | 1265949 A1 | 10/1986 |
| SU | 1580508 A1 | 7/1990 |
| TW | 201329388 A | 7/2013 |
| TW | 201405067 A | 2/2014 |
| WO | 88/02460 A1 | 4/1988 |
| WO | 2013/063898 A1 | 5/2013 |
| WO | 2013/109161 A1 | 7/2013 |
| WO | 2014/166367 A1 | 10/2014 |
| WO | 2015/171014 A1 | 11/2015 |
| WO | 2016/161363 A1 | 10/2016 |

OTHER PUBLICATIONS

PowerBalance, www.lighting.philips.com/ru-ru/index.wpd, [online].

* cited by examiner

MULTIPHASE AC POWER SUPPLY WITH CORRECTION OF DISTORTIONS OF CONSUMED CURRENT

FIELD

The described systems and methods relate to electrical engineering intended for feeding multiple electrical devices connected to a multiphase AC power supply electric network.

BACKGROUND

A power supply is one of the most critical and principal components as specified against other facilities, as it substantially defines efficiency and reliability of electric consumers, e.g. LED lights. A multiphase AC voltage supply network can be applied for improving efficiency and reliability of any power supply.

One of the most simple and, likely, commonly used power supply methods is the possibility of making connection using three-phase AC rectifiers.

Larinov's standard three-phase half-controlled bridge (6 diodes) rectifier with R1 resistive load is shown in FIG. 1.

A case of using a three-phase AC network for feeding an LED light unit is shown in FIG. 1A.

PhaseA, PhaseB, PhaseC voltage diagrams, phase amplitude to neutral accepted as a unit is shown in FIG. 2.

−PhaseA, PhaseB, PhaseC—input three-phase AC voltage

+Uout—net rectified R1 load voltage.

Though, a three-phase rectifier has some undoubted advantages, such as high power factor (PF) including low output ripple (approximately 14%) and absence of any power supply electrolytic capacitors, there is one significant problem represented by high values of input current harmonic components, especially from the 3rd to 7th harmonic. This is caused by break-down current consumed per phase. The consumed current diagram is shown in FIG. 3.

Known network power supply diagrams disclosing particular aspects allowing to solve some harmonic distortion problems are described in application HAN, MAN HYOUNG No. KR100457878 (A), IPC G08G 1/095, published on Nov. 18, 2004, in application KIM YONG HO No. KR101434508, IPC H05B 37/02, published on Aug. 26, 2014, and in the publication authored by Nikitin A. V, WO2016161363 (A1), IPC H02M11/00, published on Oct. 6, 2016.

SUMMARY

The technical result of the claimed solution is reducing harmonic components, bringing down output voltage and input current.

The phase system requires a minimum of three supply lines to three phases coverable by the claimed solution.

The specification of the claimed solution discloses a number of optional multiphase power supplies with correction of harmonic motion as specified by the example of a 3-phase AC network.

This invention can be characterized with a set of features, as follows:

A multiphase AC power supply with correction of harmonic motion comprising a primary multiphase AC rectifier, a secondary multiphase rectifier, a controller, and a secondary voltage or current source, wherein a positive output terminal of a primary multiphase rectifier is designed to have on-load connection and a negative output terminal of a primary multiphase rectifier connected to a positive output terminal of a secondary voltage or current source which negative output terminal is designed to have on-load connection, output terminals of a secondary multiphase rectifier are connected to input terminals of a secondary voltage or current source, wherein a secondary multiphase rectifier is furnished with electronic switches with each one installed in a circuit of every rectifying element and every electric switch is connected to a controller.

Secondary source electronic switches can be used as bipolar transistors, field-effect transistors or can be based on other concepts.

DETAILED DESCRIPTION

The multipurpose AC power supply is characterized in that a primary multipurpose AC rectifier and a secondary multiphase rectifier are connected so that they have similar number of lines and network phases. A 3-phase network is an option.

The preferred embodiment constitutes an additional three-phase rectifier fitted with six electronic switches each one in the circuit of every rectifier diode, either of which is connected to a controller.

Should an additional multiphase rectifier have a neutral conductor, it may be connected to additional diodes.

As for the secondary current or voltage source, it is used as an additional source for supplying direct load current, e.g. to an LED light unit, and it is configured to remove input current harmonic components, to increase efficiency of any current source by means of reduction of a input current peak value.

Figure 1:
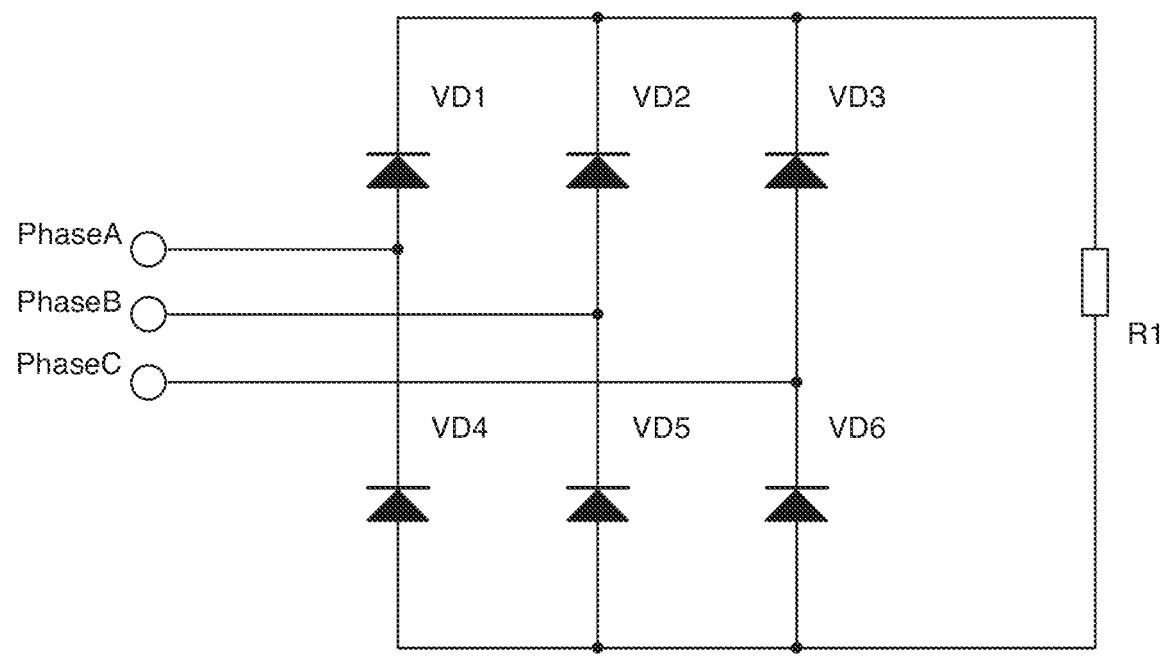
FIG. 1 depicts a three-phase half-controlled bridge rectifier with R1 resistive load.
Figure 1A:
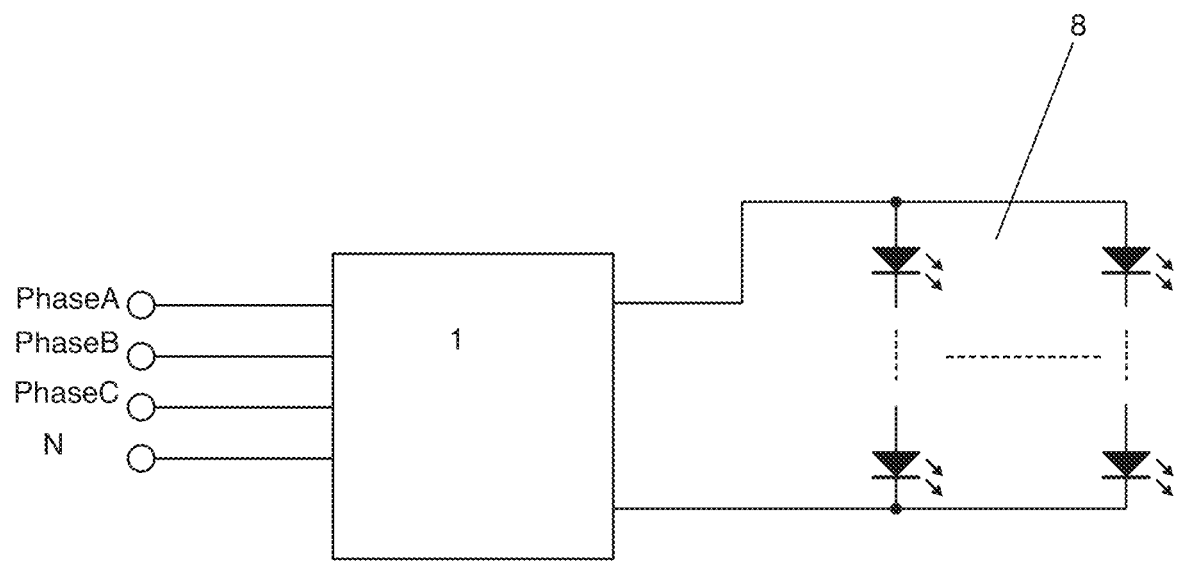
FIG. 1A depicts a three-phase AC network for feeding an LED light unit.
Figure 2:
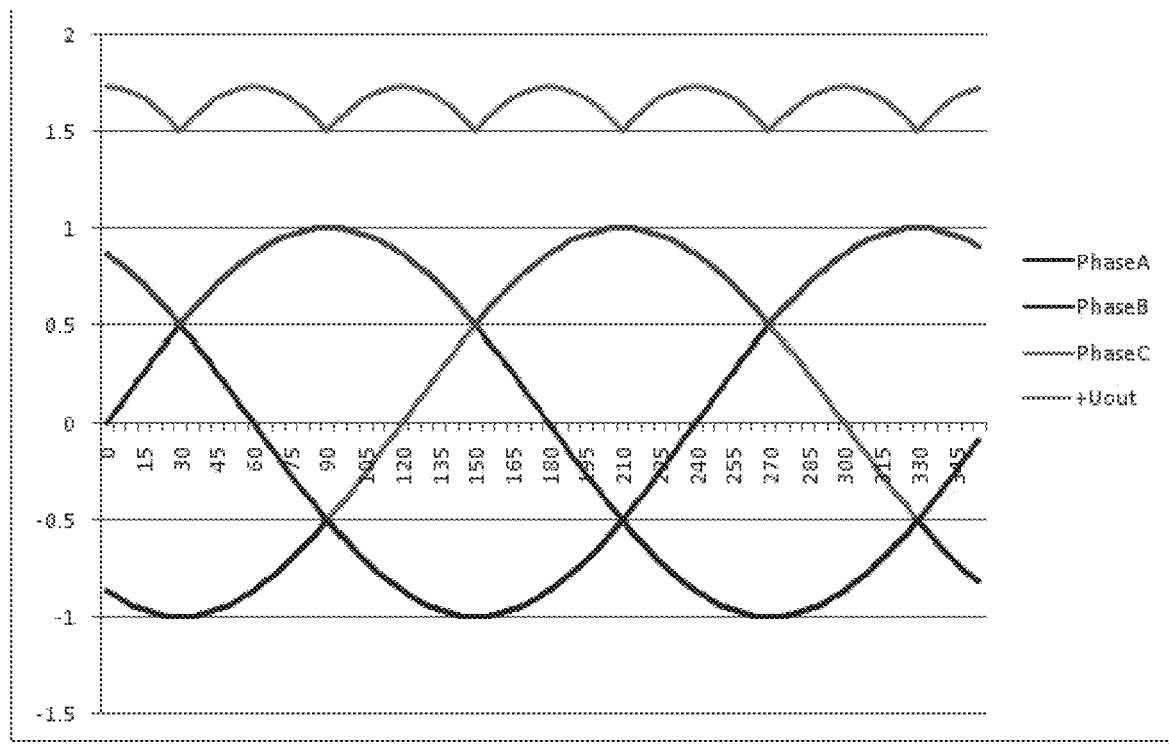
FIG. 2 depicts PhaseA, PhaseB, PhaseC voltage diagrams, phase amplitude to neutral accepted as a unit.
Figure 3:
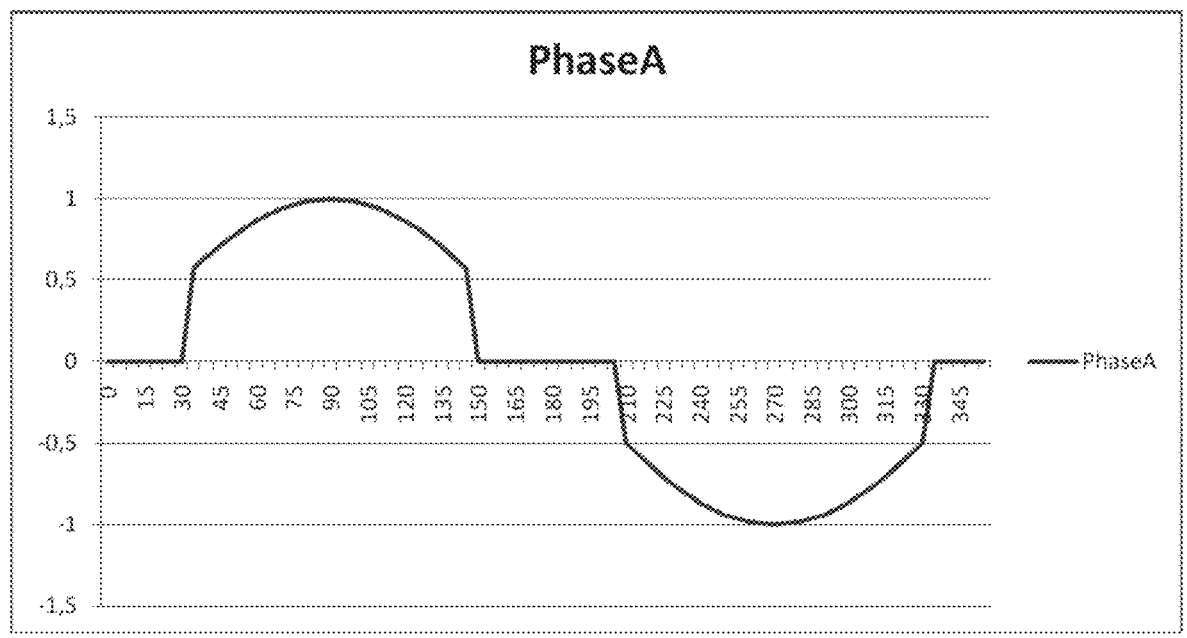
FIG. 3 depicts a consumed current diagram.
Figure 4:
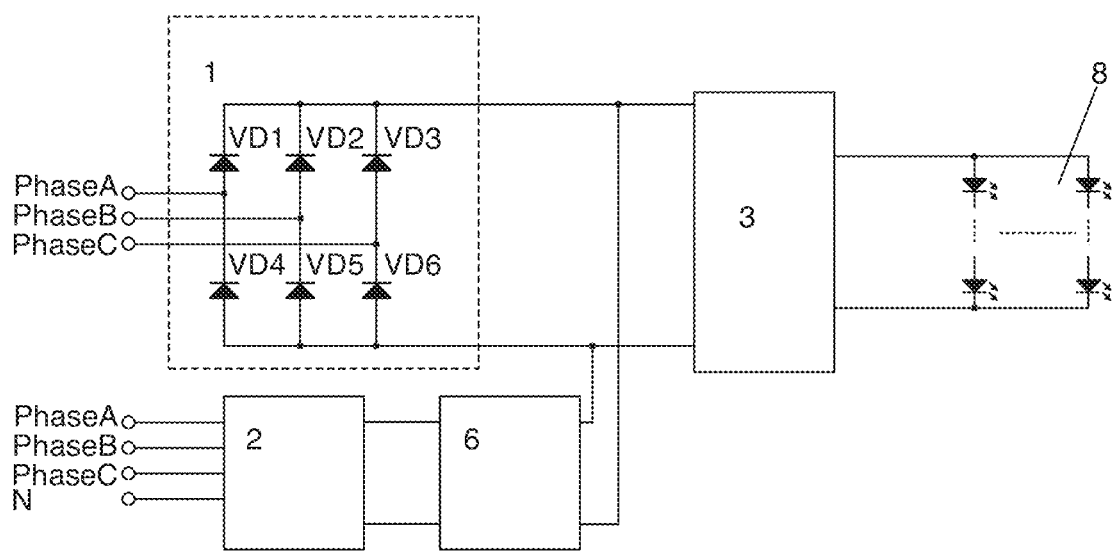
FIG. 4 depicts a circuit where an additional source is used as a current source.
Figure 5:
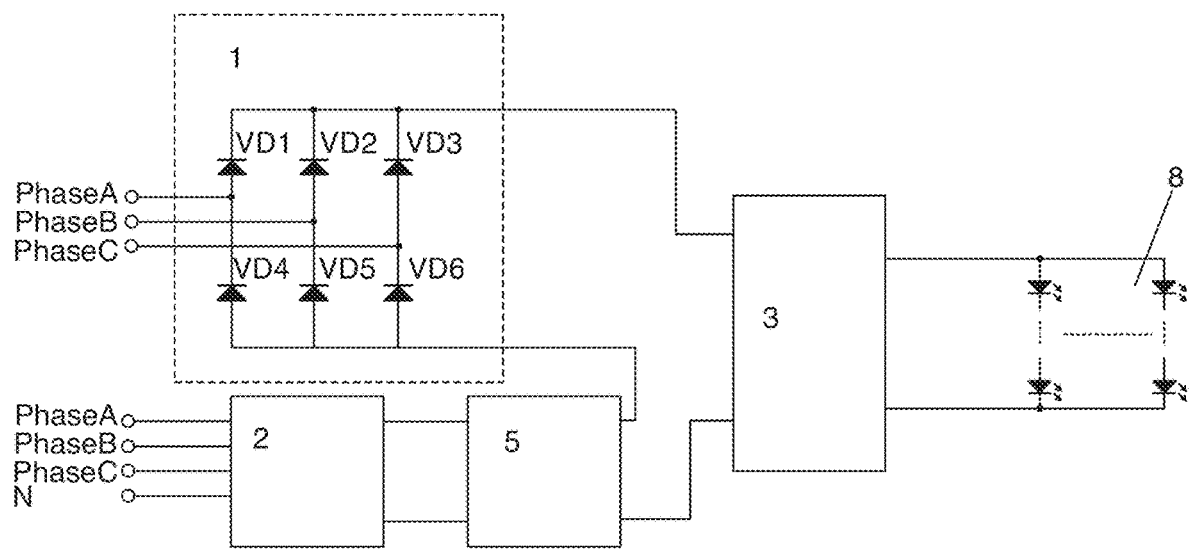
FIG. 5 depicts a circuit where the additional source is used as a voltage source.

The most effective device circuit is demonstrated in FIGS. 4 and 5 where an additional source is used as a current source (FIG. 4) or a voltage source (FIG. 5) for load, e.g. for light LEDs.

The advantage of this circuit is the exceptionally high efficiency since required power of an additional source is considerably less than that consumed directly from the primary three-phase AC power supply. This circuit can be conventionally disadvantaged by absence of galvanic isolation between LEDs and network voltage.

Figure 6:
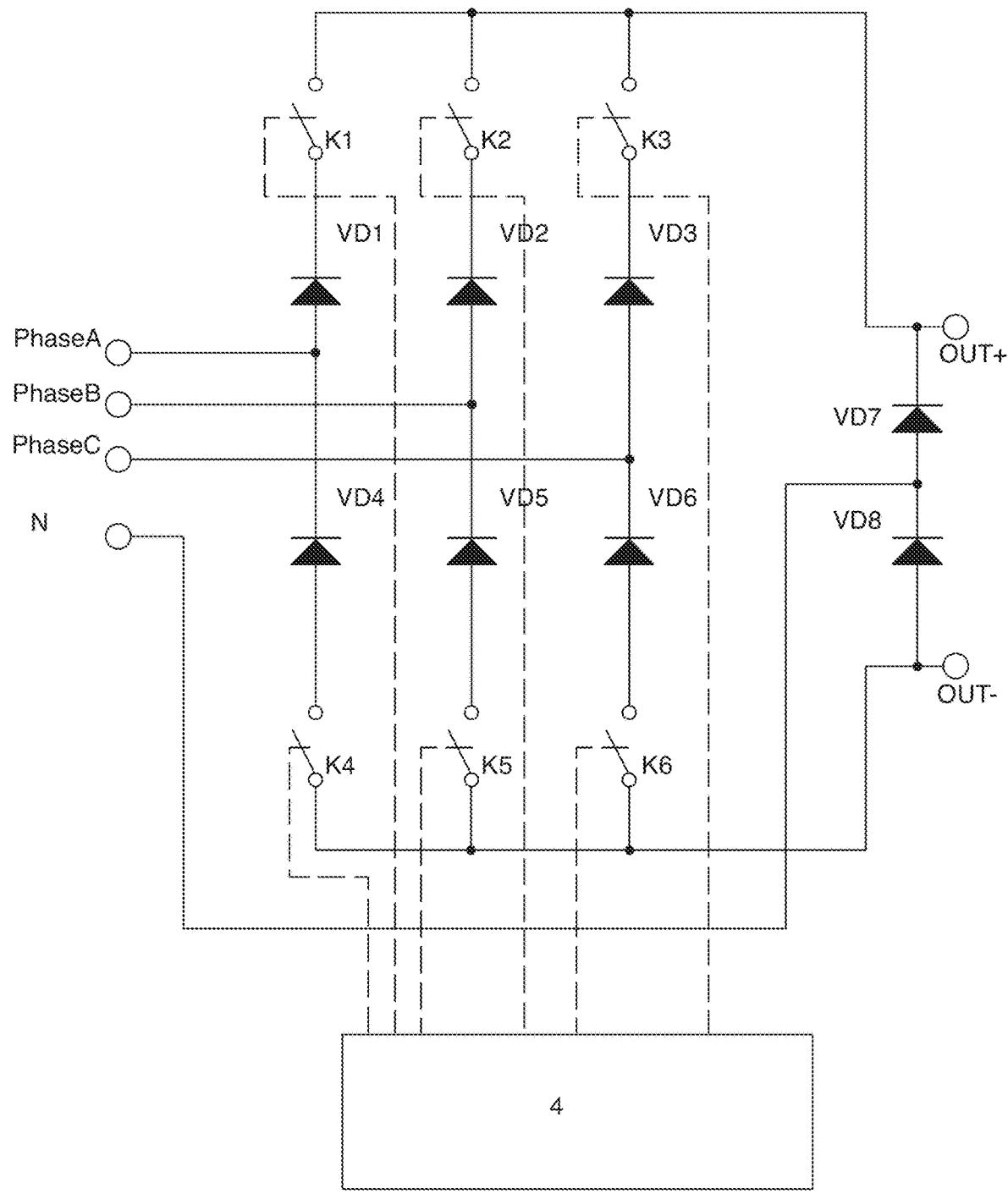
FIG. 6 depicts a three-phase network with a neutral conductor.

The variant of the claimed solution that provides for using a three-phase network with a neutral conductor is shown in FIG. 6, where a secondary three-phase rectifier with a neutral conductor connected to additional diodes is demonstrated.

Switches K1-K6 have series connection with diodes VD1-VD6 for controlling voltage between phases A, B, C, and neutral, thereby receiving rectified voltage for feeding an additional voltage or current source.

Figure 7:
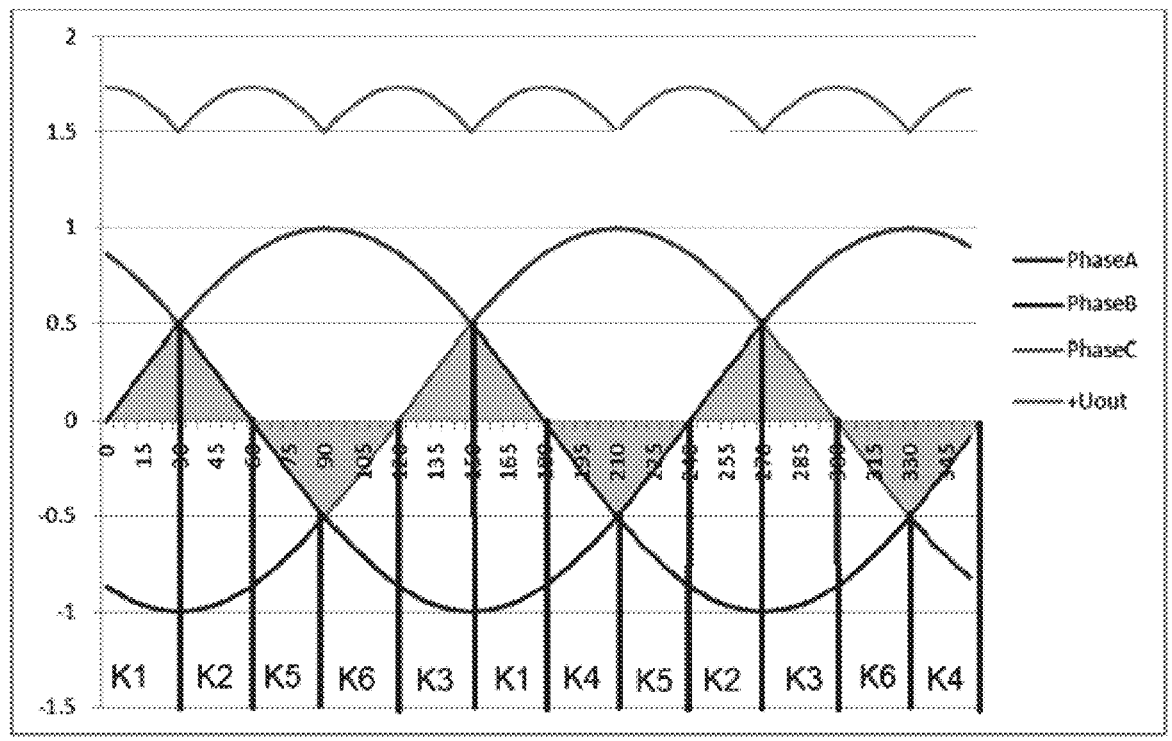
FIG. 7 depicts a key work algorithm, wherein a shaded region depicts a net input voltage supplied to a secondary LED power source.

Diodes VD7, VD8 are used in case of neutral connection. The key work algorithm is shown in FIG. 7. The shaded region in FIG. 7 specifies net input voltage supplied to a secondary LED power source used as a current source (FIG. 4) or a voltage source (FIG. 5).

Figure 8:
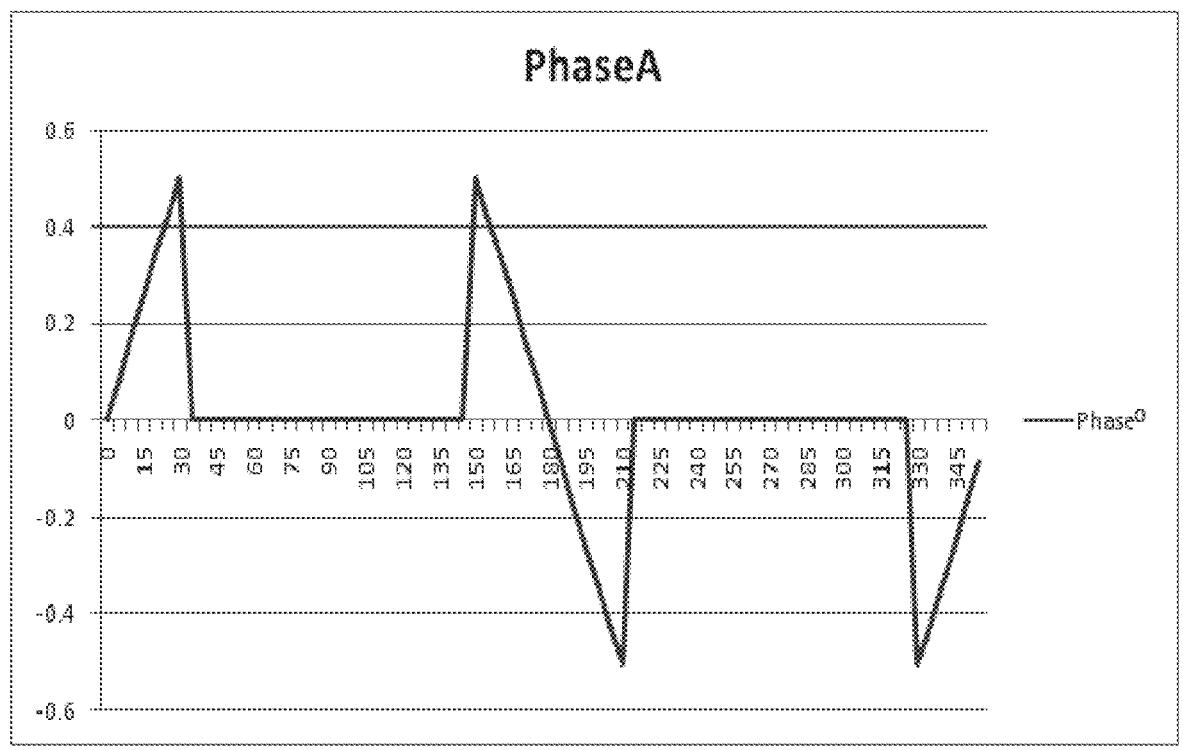
FIG. 8 depicts a secondary power source phase current diagram.

Switches K1, K2, K3 remain closed while respective phase voltage is within the range of zero to half of a peak value (0 . . . 1/2UBX). Switches K4, K5, K6 remain closed while respective phase voltage is within the range of zero to half of a peak value (0 . . . 1/2UBX). The secondary LED power source phase current diagram is shown in FIG. 8.

The following elements are specified as items illustrating a particular case using the claimed device for feeding an LED light unit from a 3-phase AC network:
1—a primary three-phase rectifier,
2—a secondary three-phase rectifier,
3—LED current source,
4—controller (electronic switch control circuit),
5—an additional voltage source,
6—an additional current source,
7—electronic switches K1, K2, K3, K4, K5, K6, each one in the circuit of every rectifier diode VD1, VD2, VD3, VD4, VD5, and VD6, and
8—load (light LEDs).

Figure 9:
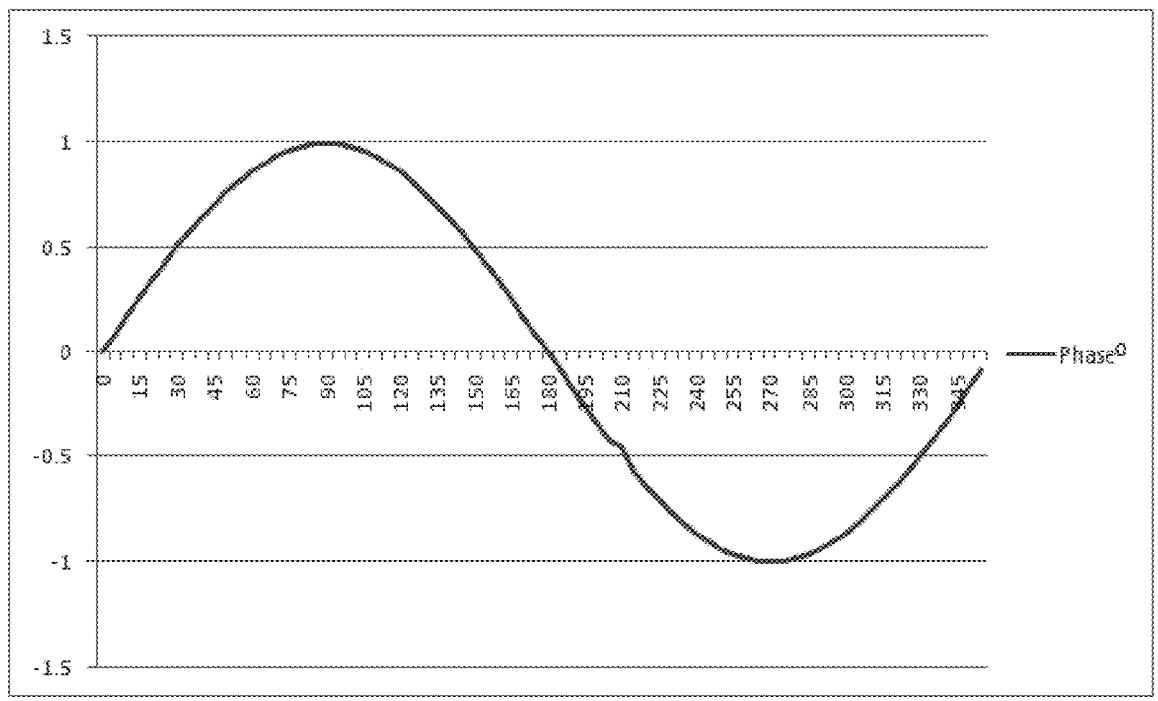
FIG. 9 depicts a net summed phase current consumed by primary and secondary three-phase rectifiers.

Net summed phase current consumed by primary and secondary three-phase rectifiers is shown in FIG. 9 where it is seen that the net phase current obtains sinusoidal nature and, respectively, its harmonic distortion is minimized.

Figure 10:
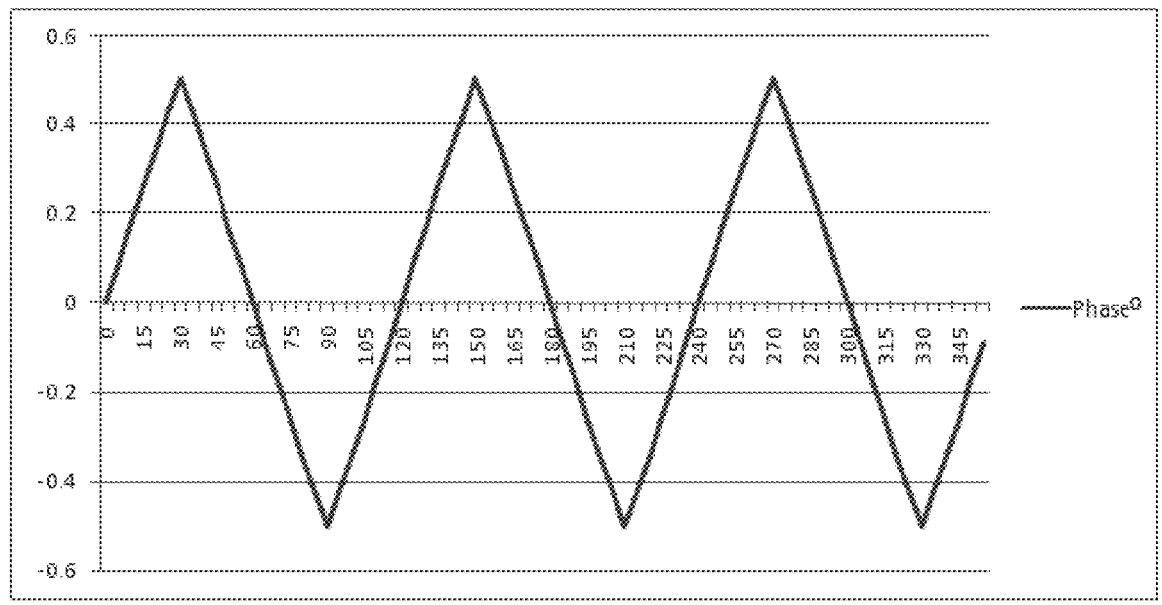
FIG. 10 depicts net current consumed through a neutral (N)

The net current consumed through the neutral (N) is shown in FIG. 10. The main disadvantage is that the neutral is used as a conductor and that there is relatively high harmonic distortion factor of current consumed through the neutral, thereby exceeding standard requirements applicable for current harmonic component level.

With additional current source 6 or voltage source 5 connected through a secondary three-phase rectifier (FIG. 6) without using a neutral, several algorithms can be used for controlling switches of secondary rectifier 2.

Figure 11:
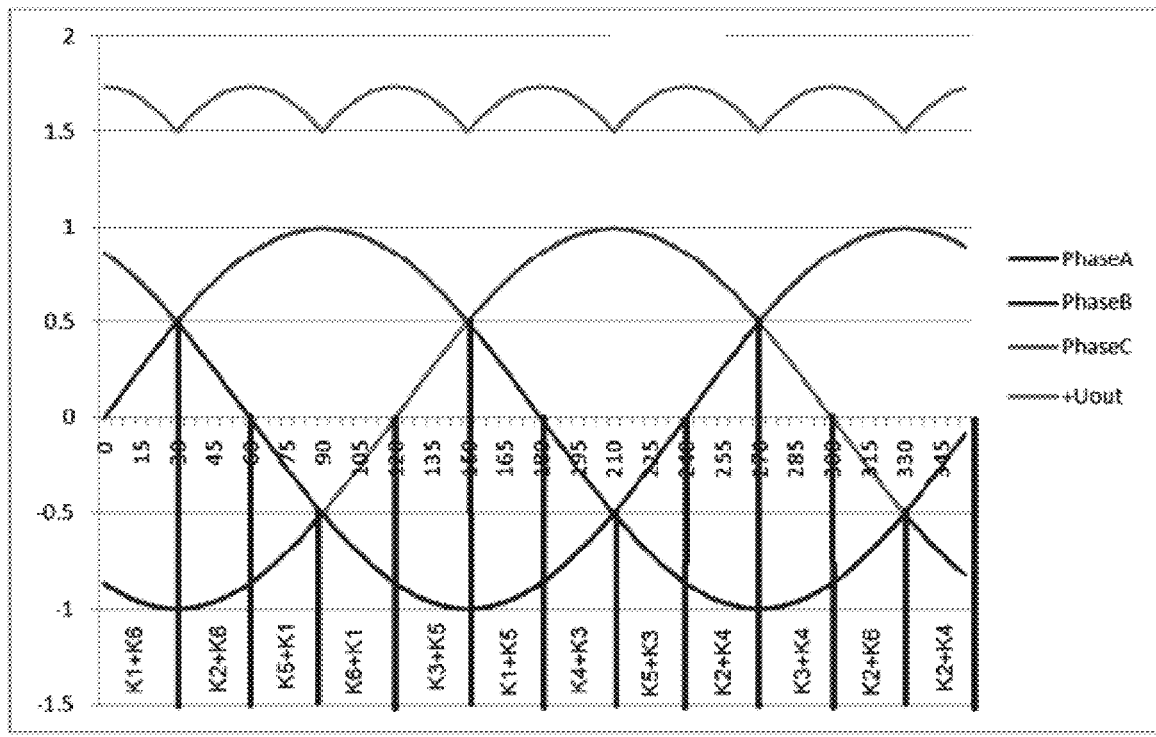
FIG. 11 depicts a K-1-K6 switching sequence.

K-1-K6 switching sequence is shown in FIG. 11 as that producing voltage supplied to a secondary LED power source.

Figure 12:
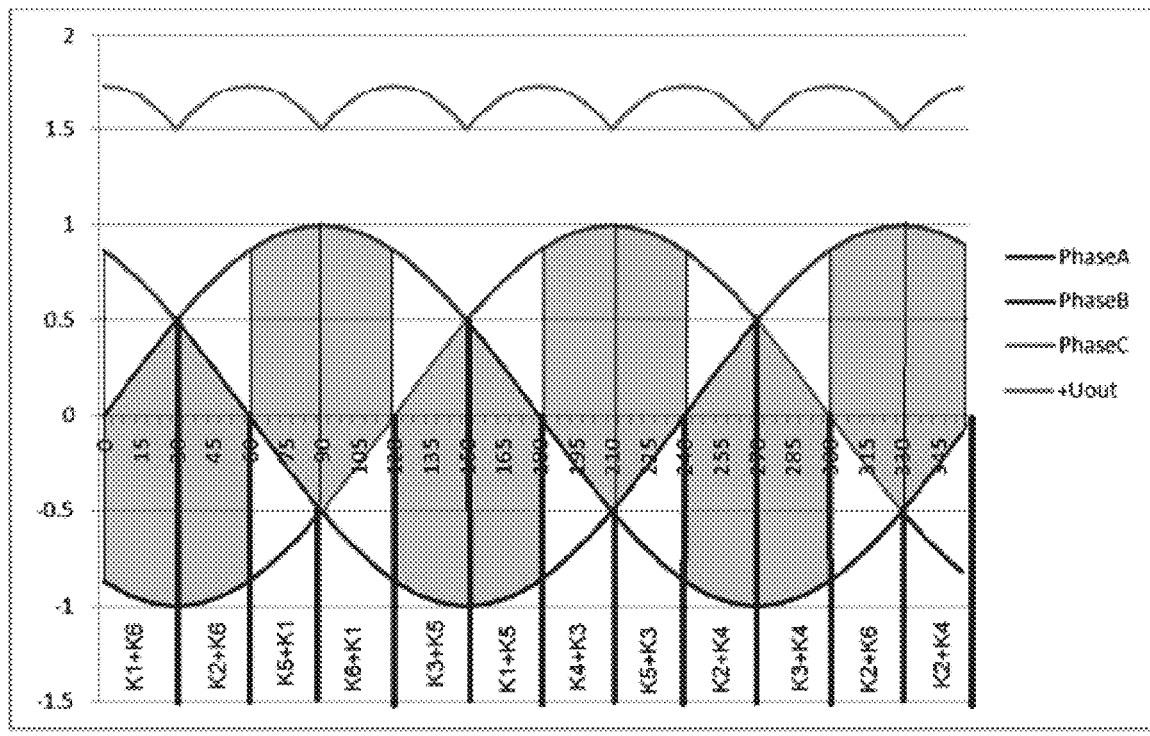
FIG. 12 depicts (with its shaded area) net voltage supplied to a secondary LED power source.
Figure 13:
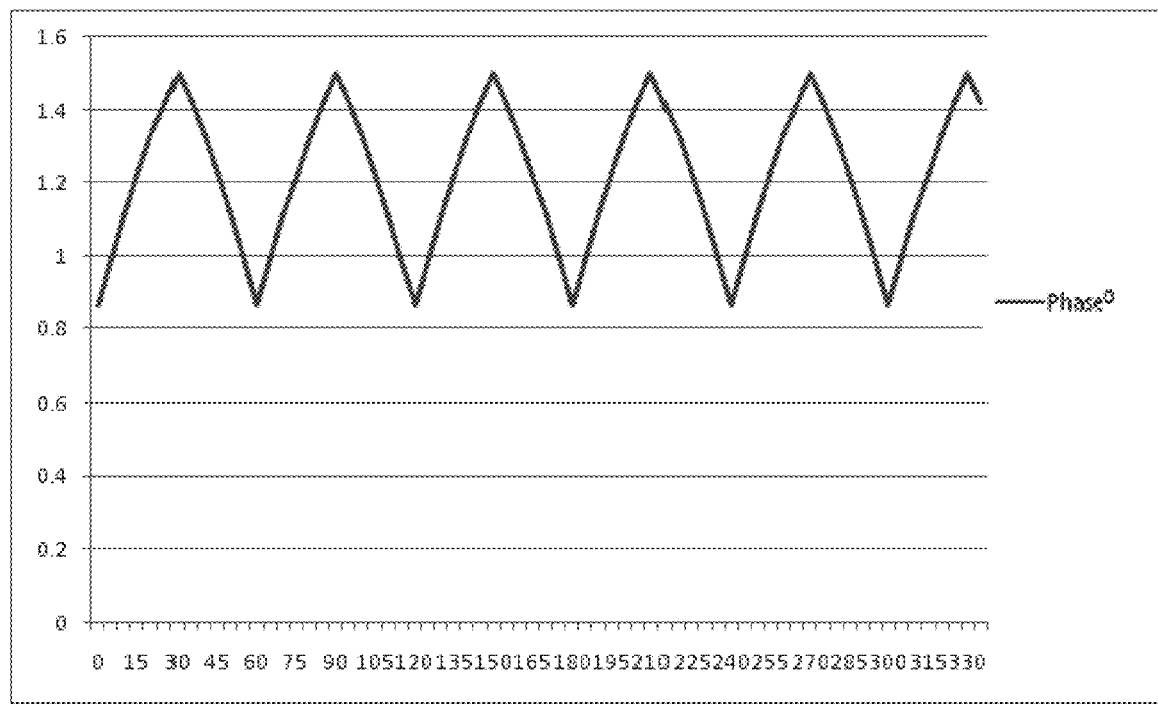
FIG. 13 depicts harmonic components of current consumed by a power supply.

The shaded area shown in FIG. 12 specifies net voltage supplied to a secondary LED power source. The K1-K6 switching algorithm is intended for feeding an additional voltage source (FIG. 5) with one phase used for supplying current through three-phase rectifier 1 that is equal to zero; diodes VD7, VD8 are not used.

The advantage of this rectifier control circuit is that it is actually possible to completely compensate harmonic components of current consumed by a power supply and to completely compensate voltage ripple for the switching circuit shown in FIG. 5.

Figure 14:
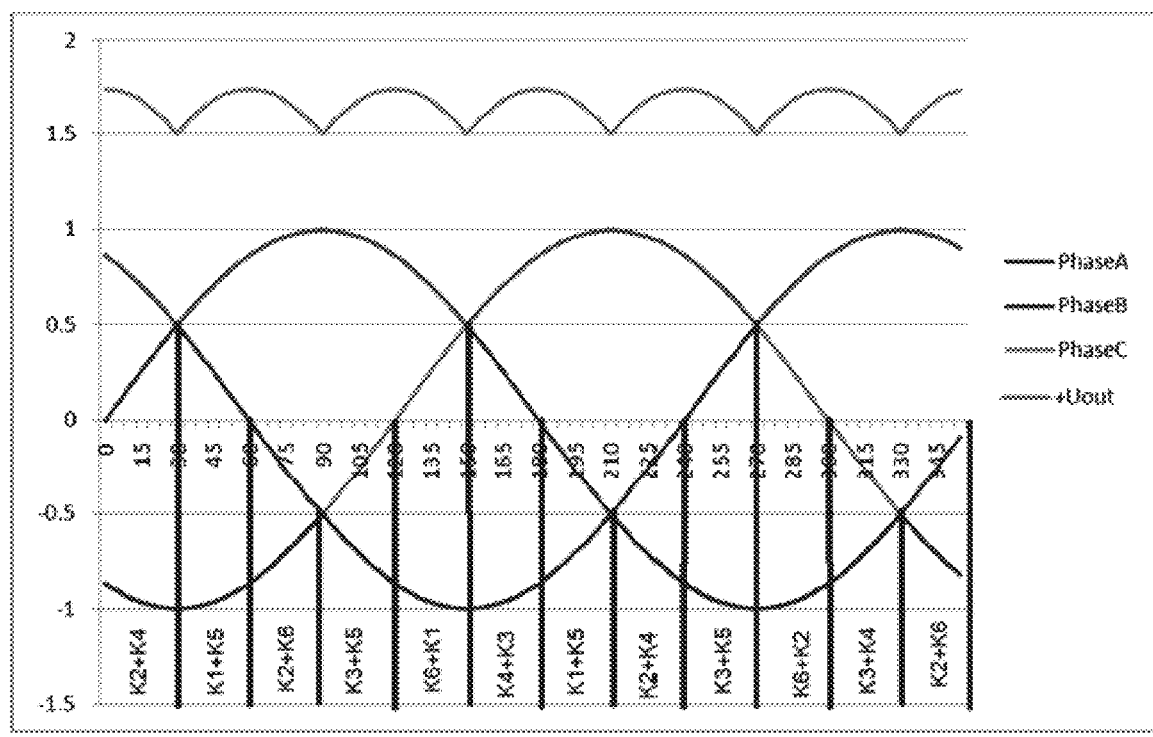
FIG. 14 depicts a switch control algorithm.

Another switch control algorithm is shown in FIG. 14. The secondary three-phase rectifier switching algorithm is based on using two phases through which the least rectified voltage is supplied relative to a neutral or virtual zero (net three-phase voltage with a sign taken into account).

Figure 15:
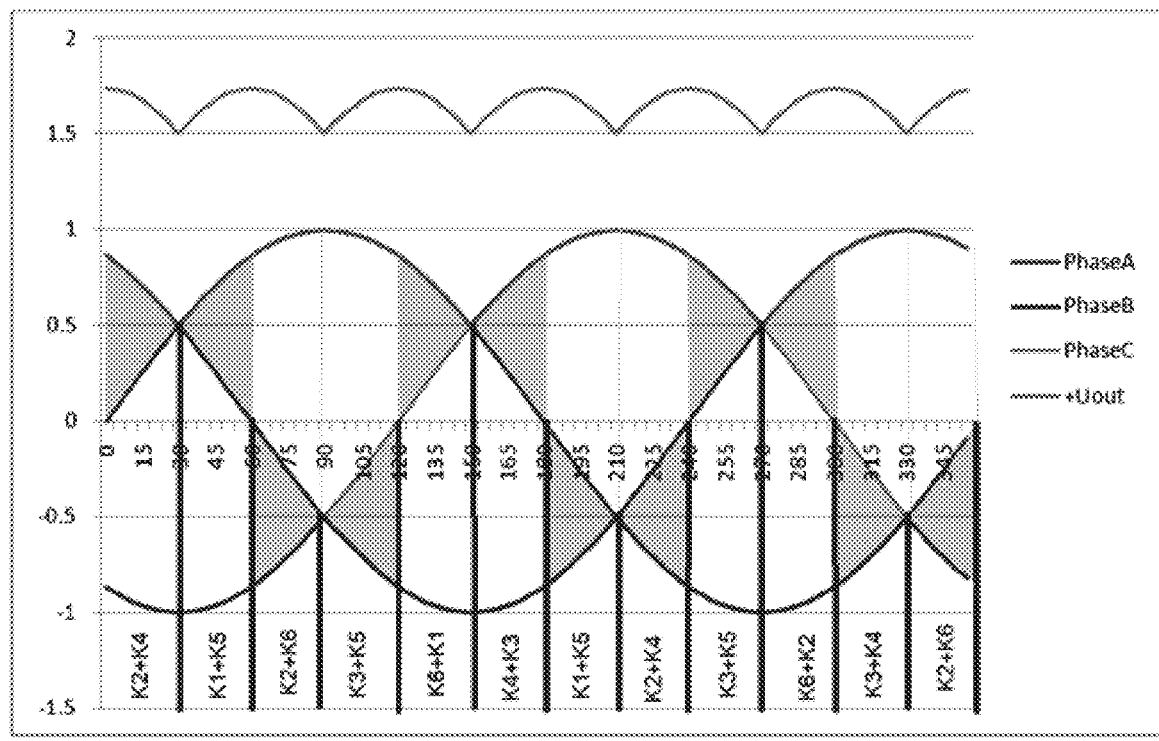
FIG. 15 depicts (via its shaded region) input voltage supplied to the secondary LED power source.

The shaded region in FIG. 15 specifies input voltage supplied to a secondary LED power source.

Figure 16:
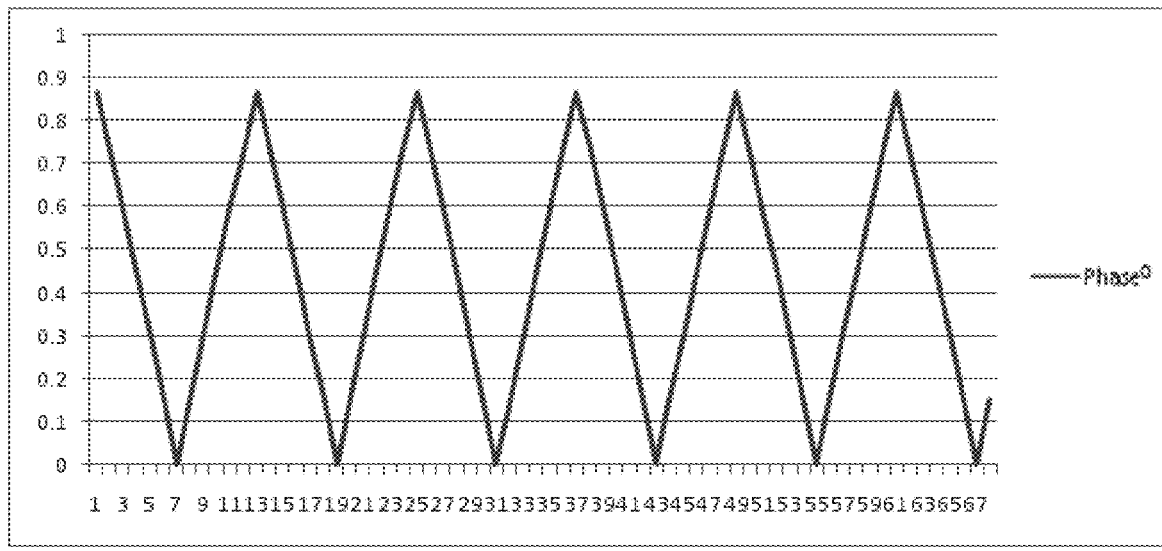
FIG. 16 depicts a secondary three-phase rectifier output voltage to be specified as that supplied to a secondary power source.

Secondary three-phase rectifier output voltage to be specified as that supplied to a secondary power source is shown in FIG. 16.

The advantage of this rectifier control circuit is that the rectified voltage peak value is reduced and therefore, a secondary power source can be kept out of any strict requirements. The disadvantage is that it is not possible to completely compensate harmonic components of input current.

We claim:

1. A multiphase AC power supply with harmonic distortion correction, comprising:
   a main multiphase AC rectifier;
   an additional multiphase rectifier;
   a controller; and
   an additional voltage or current source,
   wherein:
      a positive output of the main multiphase AC rectifier is configured to be connected through a first wired connection to a single load,
      a negative terminal of the main multiphase AC rectifier is directly connected to a positive terminal of the additional voltage or current source,
      a negative output of the additional voltage or current source being configured to be connected through a second wired connection to the single load,
      output terminals of the additional multiphase rectifier are directly connected to input terminals of the additional voltage or current, and
      the additional multiphase rectifier is equipped with electronic keys, with one of the electronic keys in a circuit of each rectifier element of the additional multiphase rectifier, and with each of the electronic keys connected to the controller.

2. The multiphase AC power supply with harmonic distortion correction of claim 1, wherein the main multipurpose AC rectifier and the additional multiphase rectifier have an equal number of phases.

3. The multiphase AC power supply with harmonic distortion correction of claim 2, wherein the main multipurpose AC rectifier and the additional multiphase rectifier each have three phases.

4. The multiphase AC power supply with harmonic distortion correction of claim 1, wherein the electronic keys of the additional multiphase rectifier each comprise at least one of a bipolar transistor and a field effect transistor.

5. The multiphase AC power supply with harmonic distortion correction of claim 1, wherein a number of phases of the main multiphase AC rectifier is equal to three, wherein the additional multiphase rectifier comprises a three-phase rectifier that is equipped with six electronic keys, with one of the electronic keys in the circuit of each rectifier diode, and with each of the electronic keys being connected to the controller.

6. The multiphase AC power supply with harmonic distortion correction of claim 1, wherein the controller is configured to switch off at least one of the electronic keys at multiple points in a corresponding phase cycle.

7. The multiphase AC power supply with harmonic distortion correction of claim 6, wherein the controller is configured to switch off the at least one of the electronic keys when a voltage of a first phase substantially equals a voltage of a second phase and when the voltage of the first phase is greater than or less than zero.

8. The multiphase AC power supply with harmonic distortion correction of claim 6, wherein the controller is configured to switch off the at least one of the electronic keys in the additional multiphase rectifier while another of the at least one electronic keys in the additional multiphase rectifier is on.

9. The multiphase AC power supply with harmonic distortion correction of claim 1, wherein the additional multiphase rectifier differs from the main multiphase AC rectifier in that the additional multiphase rectifier comprises the electronic keys.

10. A multiphase AC power supply with harmonic distortion correction, comprising: a main multiphase AC rectifier; an additional multiphase rectifier, wherein the additional multiphase rectifier differs from the main multiphase AC rectifier in that the additional multiphase rectifier comprises electronic keys, with one of the electronic keys in a circuit of each rectifier element of the additional multiphase rectifier; a controller; and an additional voltage or current source, wherein: a positive output of the main multiphase AC rectifier is configured to be connected to a load,
    a negative terminal of the main multiphase AC rectifier is directly connected to a positive terminal of the additional voltage or current source,
    a negative output of the additional voltage or current source being configured to be connected to the load, output terminals of the additional multiphase rectifier that are directly connected to input terminals of the additional voltage or current, and each of the electronic keys is connected to the controller.

11. The multiphase AC power supply with harmonic distortion correction of claim 10, wherein the controller is configured to switch off at least (i) one of the electronic keys and (ii) a pair of the electronic keys at one or more points during a phase cycle of a corresponding phase produced by the additional multiphase rectifier.

12. The multiphase AC power supply with harmonic distortion correction of claim 10, wherein the controller is configured to switch off at least one of the electronic keys during a phase cycle, and wherein the controller is configured to switch off the at least one of the electronic keys when a voltage of a first phase substantially equals a voltage of a second phase and when the voltage of the first phase is greater than or less than zero.

13. The multiphase AC power supply with harmonic distortion correction of claim 10, wherein the additional multiphase rectifier differs from the main multiphase AC rectifier in that the additional multiphase rectifier comprises the electronic keys.

14. The multiphase AC power supply with harmonic distortion correction of claim 10, wherein the negative terminal of the main multiphase AC rectifier is directly connected to the positive terminal of the additional voltage or current source.

15. A multiphase AC power supply with harmonic distortion correction, comprising: a main multiphase AC rectifier; an additional multiphase rectifier; a controller; and an additional voltage or current source, wherein: a positive output of the main multiphase AC rectifier is configured to be connected to a load,
    a negative terminal of the main multiphase AC rectifier is directly connected to a positive terminal of the additional voltage or current source,
    a negative output of the additional voltage or current source being configured to be connected to the load, output terminals of the additional multiphase rectifier are directly connected to input terminals of the additional voltage or current, the additional multiphase rectifier is equipped with electronic keys, with one of the electronic keys in a circuit of each rectifier element of the additional multiphase rectifier, and with each of the electronic keys connected to the controller, and the controller is configured to switch off at least one of the electronic keys during a phase cycle.

16. The multiphase AC power supply with harmonic distortion correction of claim 15, wherein the controller is configured to switch off the at least one of the electronic keys when a voltage of a first phase substantially equals a voltage of a second phase and when the voltage of the first phase is greater than or less than zero.

17. The multiphase AC power supply with harmonic distortion correction of claim 16, wherein the controller is configured to switch off the at least one of the electronic keys when the voltage of the first phase and the voltage of the second phase are zero.

18. The multiphase AC power supply with harmonic distortion correction of claim 15, wherein the positive output of the main multiphase AC rectifier is configured to be connected through a first wired connection to the load, the load being a single load, and the negative output of the additional voltage or current source being configured to be connected through a second wired connection to the single load.

19. The multiphase AC power supply with harmonic distortion correction of claim 15, wherein the additional multiphase rectifier differs from the main multiphase AC rectifier in that the additional multiphase rectifier comprises the electronic keys.

* * * * *